United States Patent [19]
O'Rourke

[11] Patent Number: 5,228,411
[45] Date of Patent: Jul. 20, 1993

[54] SELF-SUPPORTING COTTON BIRD PERCH

[75] Inventor: Anthony O'Rourke, Malibu, Calif.

[73] Assignee: Booda Products, Inc., Gardena, Calif.

[21] Appl. No.: 939,291

[22] Filed: Sep. 2, 1992

[51] Int. Cl.$^5$ .............................................. A01K 31/12
[52] U.S. Cl. ........................................ 119/26; 57/252; 428/393
[58] Field of Search ............... 119/24, 25, 26; 57/238, 57/252, 256; 428/364, 365, 393, 377; 24/298, 302, 122.6

[56] References Cited

U.S. PATENT DOCUMENTS

| | | | |
|---|---|---|---|
| 1,192,441 | 7/1916 | Lydecker | 119/26 |
| 2,707,936 | 5/1955 | Kiehl | 119/26 |
| 3,226,877 | 1/1966 | Anderson | 119/25 |
| 5,099,796 | 3/1992 | Morgan | 119/26 |

OTHER PUBLICATIONS

"Jungle Vine TM" Dura Pro Products Inc. Elmira, N.Y., Mar. 1990, (5 page brochure).

Primary Examiner—Gene Mancene
Assistant Examiner—Todd E. Manahan
Attorney, Agent, or Firm—Lyon & Lyon

[57] ABSTRACT

An adjustable and stable cotton bird perch for use in a bird cage is comprised of a plurality of tightly twisted skeins of cotton threads defining a dense cotton cable. The cable has attachment members secured to the ends thereof for securing the cable to the sides of the bird cage. The formed cotton cable has a density of about fifty to seventy percent greater than conventional cotton rope so as to render the cable sufficiently flexible to be readily formed into a plurality of different set configurations and sufficiently rigid so as to retain a set configuration without the need for additional support intermediary of its ends. By varying the configuration of the cable, a wide variety of stable cotton bird perch configurations can be readily provided within the cage.

15 Claims, 3 Drawing Sheets

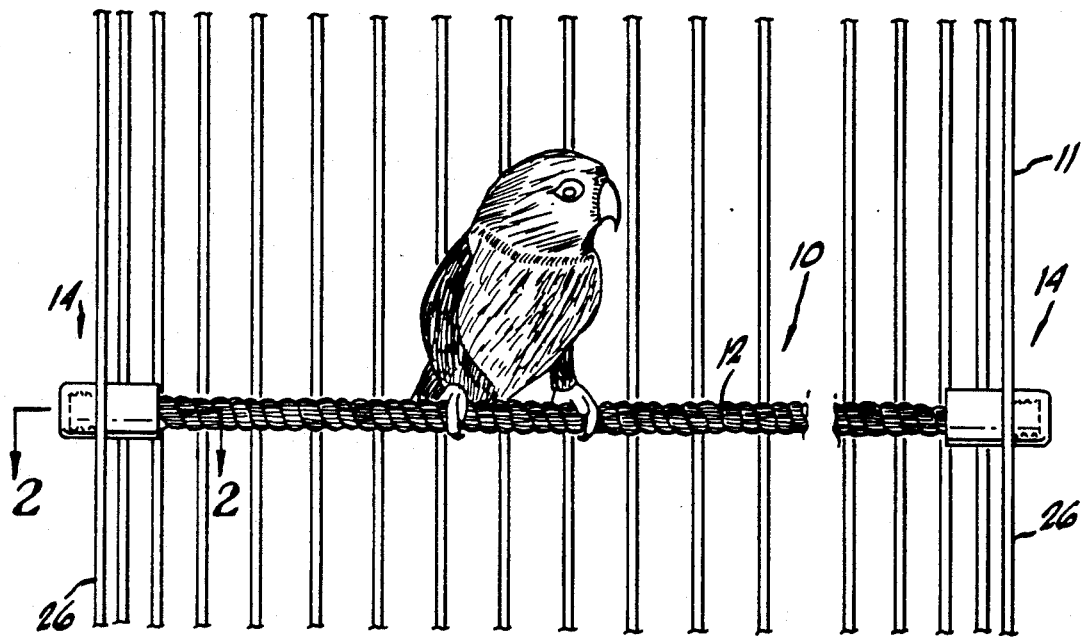
fig. 1.
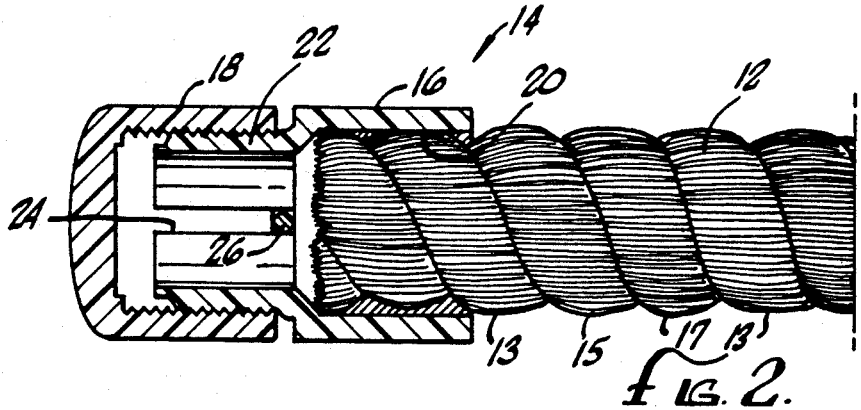
fig. 2.
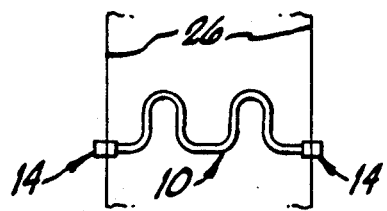 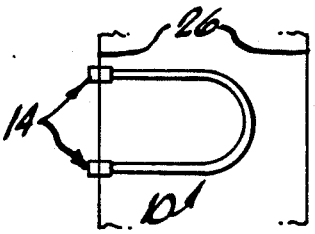
fig. 3a.   fig. 3b.   fig. 3c.

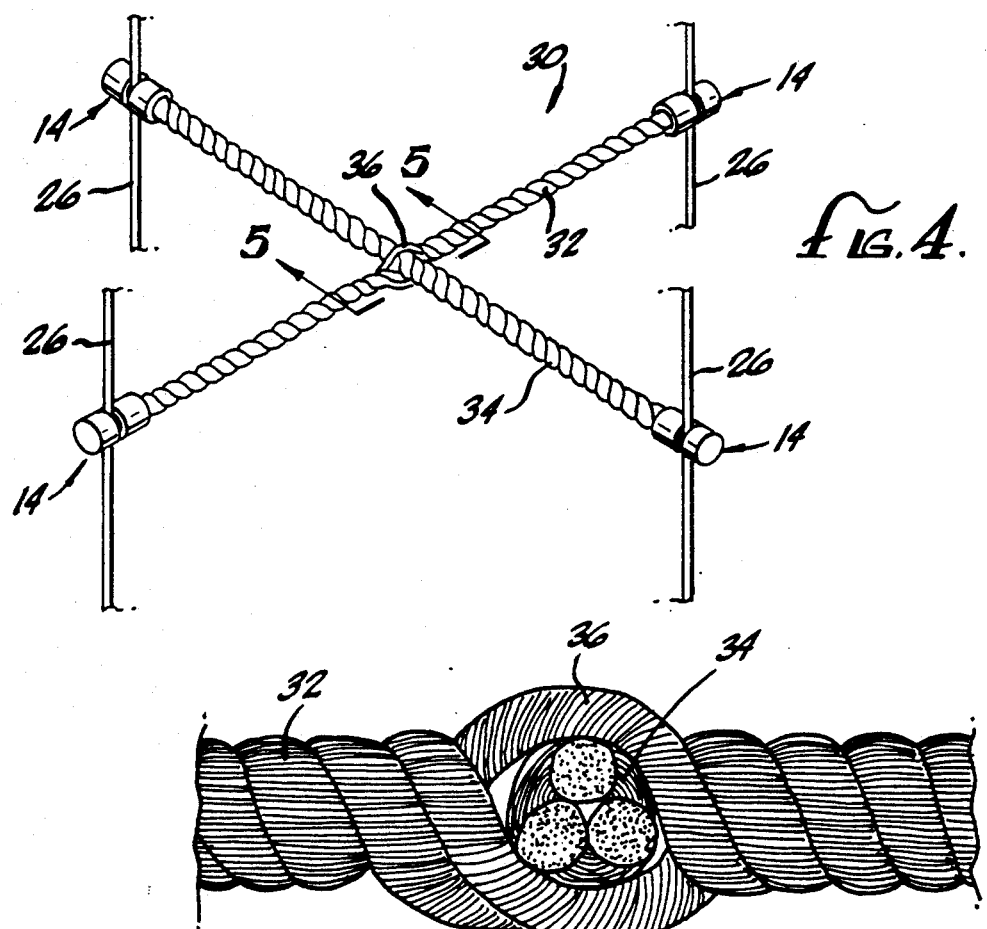
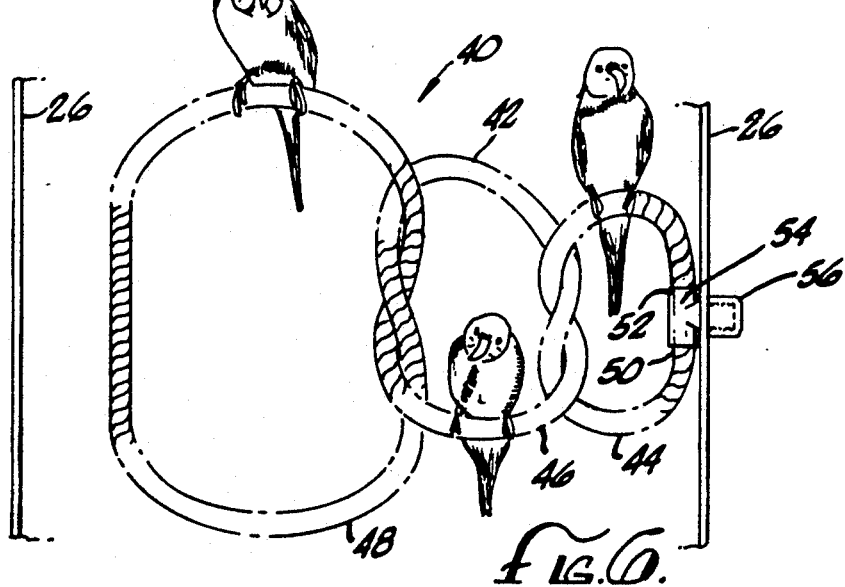

SELF-SUPPORTING COTTON BIRD PERCH

BACKGROUND OF THE INVENTION

The present invention relates to a novel perch for birds in an caged environment. Bird perches are standard equipment for bird cages and are constructed of numerous different materials and in a wide variety of configurations. In recent years, conventional cotton rope has become very popular for use as a bird perch as it provides a comfortable surface for the birds, can be easily climbed and presents a safe pecking surface which birds seem to enjoy. However, cotton rope is too flexible to form a stable or rigid perch. It tends to sag and swing and assume a gravity formed arc rather than a more desirable level perch that is relatively stable. The inclusion of a supporting element such as a stiffening wire disposed within the cotton rope perch to stabilize the perch would present a safety hazard to birds in the event birds were to chew or peck through the cotton. Birds have also been found to entangle their claws in the relatively loose cotton fiber threads of the rope which presents a safety hazard to the birds. In addition, breeders of birds have found that many caged birds prefer variations in perch configurations and in perch elevations to avoid cage boredom and resultant stress and feather picking. The highly pliable nature of conventional cotton rope makes such perch designs very difficult to achieve.

Thus, while cotton perches are extremely popular with birds, they are very limited in their application and can present a safety hazard to the birds. It would be highly desirable to provide a bird perch which retains the feel of cotton which birds seem to prefer, which eliminates the safety hazard presented by conventional cotton perches and which additionally provides the stability and flexibility in perch configurations lacking in the cotton perches heretofore available. The bird perch of the present invention achieves these objectives.

SUMMARY OF THE INVENTION

The present invention is directed to a stable cotton bird perch adapted to be readily formed into different bird perch configurations and mounted in a wire bird cage. The perch of the present invention comprises one or more lengths of cotton cable defined by a plurality of tightly twisted cotton threads. The cotton cable has sufficient flexibility so as to be capable of being readily formed into a desired configuration and sufficient rigidity to retain that configuration without the need for additional supporting structure such as interiorly disposed stiffening wires. Attachment means are carried by the ends of the cable(s) for securing the cable(s) to the wire cage such that the cable(s) extends across the interior of the cage and, depending upon the formed configuration, defines one or more stable perch surfaces for birds. By very tightly twisting individual cotton threads in an otherwise conventional rope forming process, a cotton cable is formed having a density of about fifty to seventy percent greater than conventional cotton rope. This density provides the cotton perch with the aforesaid flexibility and rigidity characteristics which enable the perch of the present invention to overcome the problems heretofore experienced with cotton bird perches while retaining all of the benefits thereof.

In one embodiment of the invention a single length of the densely formed cotton cable is employed which is provided with cage attachments at both of its extended ends. By sizing the cable such that it corresponds with a transverse dimension of the case, an elongated single elevation, rigid stable perch can be disposed across the cage. By sizing the cable such that it defines a length greater than the transverse dimension of the bird cage, the ends of the cotton cable can be secured to oppositely disposed portions of the cage, and the cable can be bent at one or more locations intermediary its ends to provide a wide variety of perch configurations at different heights within the cage. The rigidity in the cable resulting from the tightly twisted cotton threads provides the desired stability for the formed perch or perches and retains the formed perch configurations without additional support. The pliability of the cotton threads, however, provides sufficient flexibility in the cable so as to allow one to readily configure the cotton cable to the desired perch configuration and alter the perch configurations as desired. In a variation of the single cable perch, the cable could be formed into a closed ring and provided with an attachment member for securing the ring to the cage. The rigidity of the cable allows the ring-shaped perch to retain its configuration without the need for additional support.

In an alternate embodiment of the invention, two lengths of the densely formed cotton cable are employed which are secured together by directing one of the cables between the strands of the other to provide a tight yet translatable securement. Cage attachments are secured to the extended ends of the formed structures. By sizing the lengths of the two cables to correspond to the transverse dimensions of the cage, two perpendicularly disposed, elongated, single elevation perches can be provided in the cage. By oversizing the cables with respect to the cage, the translatable securement of the cable in combination with the self-supporting dense cable provides a highly flexible perch capable of being formed intermediary of the cage attachment brackets into a wide variety of stable perch configurations for one or more birds.

In a third embodiment of the invention, a length of the dense cotton cable is formed into a series of interconnected loops or rings which provide sufficient relative slippage therebetween such that each ring may be readily adjusted to a different size and/or shape to provide a plurality of stable perch surfaces and configurations to accommodate different sizes and numbers of birds. The formed rings are sufficiently rigid so as to be self-supporting and retain their form, shape, and configuration within the cage.

It is the principal object of the present invention to provide an improved perch for caged birds.

It is another object of the present invention to provide a highly versatile perch for birds which can be readily secured in a cage and formed into a wide variety of different configurations.

It is yet another object of the present invention to provide a stable cotton bird perch which readily can be formed into a wide variety of perch configurations and retain its shape without the need for additional support.

These and other objects and advantages of the present invention will become readily apparent from the following detailed description taken in conjunction with the accompanying drawings.

DESCRIPTION OF THE PREFERRED EMBODIMENT IN THE DRAWINGS

FIG. 1 is a front plan view of a first embodiment of the bird perch of the present invention shown mounted in a bird cage.

FIG. 2 is sectional view taken along the lines 2—2 in FIG. 1.

FIGS. 3a-3c are schematic representations of the bird perch of the present invention illustrating examples of different perch configurations which can be formed therewith.

FIG. 4 is a perspective view of a second embodiment of the present invention.

FIG. 5 is a section view taken along the lines 4—4 in FIG. 4.

FIG. 6 is a front plan view of a third embodiment of the present invention.

Figure 7:
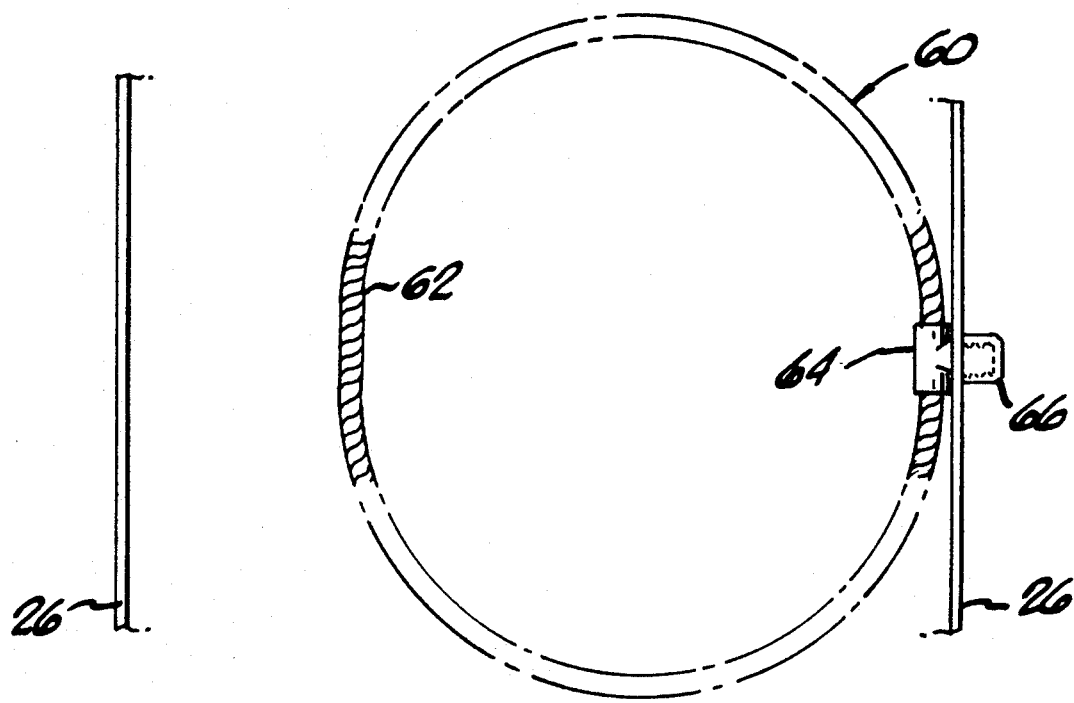
FIG. 7 is a front plan view of a fourth embodiment of the present invention.

Referring now in detail to the drawings, the bird perch 10 of the present invention illustrated in FIG. 1 comprises a length of cotton cable 12 and a pair of cage attachments 14. Cable 12 is formed by twisting a large plurality of individual cotton threads into three strands or skeins 13, 15 and 17 and very tightly twisting the formed skeins in a conventional rope forming pattern. By substantially increasing the number of individual threads used to form each skein as compared to the number of threads used in forming the skeins for comparably sized conventional rope, and twisting the skeins significantly tighter than in a conventional rope forming process, the resultant cotton cable 12 is relatively rigid yet capable of being readily formed into a wide variety of different bird perch configurations such as those shown in FIGS. 3a-3c. A cage attachment 14 is secured to each end of the formed cable 12 for securing the extended ends of the cable 12 to a bird cage 11 such that the cotton cable extends across the cage and defines one or more perches for one or more birds. By so forming the cable 12 such that it is about fifty to seventy percent more dense than conventional cotton rope, and preferably about sixty to sixty-five percent more dense, the resultant cable 12 is sufficiently flexible to be readily bent into the desired perch configuration(s), yet is sufficiently rigid that the tightly wound threads will retain the formed shape of the cable in the cage without any additional support.

The individual cotton threads which comprise cable 12 are identical to those commonly used in the manufacture of conventional cotton rope. The threads are preferably formed entirely of cotton fibers but could also be comprised of a blend of cotton and other natural or synthetic fibers, such as polyester. In such cotton blends, the cotton fibers should comprise 70% of the threads and preferably comprise at least 95% of the threads. Unless otherwise stated, the term cotton as used herein is intended to include such cotton blends.

By way of comparison, conventional cotton rope has a density of about 0.47 grams per cubic centimeter and is comprised of approximately 1,150 cotton threads per cubic centimeter. This density may vary somewhat due to slight variations in the twisting torque applied to the threads and skeins in forming cotton rope, but is generally within the range of about 0.43 to 0.5 grams per cubic centimeter. In contrast, a typical cotton cable 12 of the present invention has a density of about 0.77 grams per cubic centimeter and a thread count of about 1,890 cotton threads per cubic centimeter. Thus, the density of cotton cable 12 is about 1.64 times that of conventional cotton rope, or sixty-four percent greater. Variations in the twisting torque exerted on the cotton threads in forming skeins 13, 15 and 17 and in twisting the skeins into cable 12 will result in slight variations of the density of cable 12. In addition, this twisting torque can be varied somewhat either to effect slight increases or decreases in the density of a cable 12 to vary the rigidity and flexibility thereof. While the cotton cable 12 is preferably formed so as to have a density of about 0.77 grams per cubic centimeter, this density could be varied between about 0.7 to 0.8 grams per cubic centimeter (about fifty to seventy percent more dense than conventional cotton rope) and still have the desired combination of flexibility and rigidity necessary in the present invention.

The significant increase in density of cable 12 over that of conventional rope is achieved first by pre-twisting about fifty to sixty percent more threads to form on each skein than would be used in forming a length of conventional rope of the same size as cable 12, and second, by twisting the skeins together utilizing a conventional rope forming pattern, substantially more tightly than is done in a conventional rope forming process. The tighter twist is accomplished by applying a greater twisting torque to the threads and increasing the time of the twist for a given length of cable. The twisting torque exerted on the cotton threads to form the skeins into a medium-sized of about ⅝ inch in diameter cable 12 is about 7.87 foot pounds as compared to a twisting torque of about 5.24 foot pounds used in forming conventional cotton rope of comparable size. This torque ratio of 1.5 to 1.0 is applicable to comparatively sized cable and rope of varying diameters. Further, this tighter twisting of the threads is forming cable 12 is carried out for approximately twice the time used in forming a comparable length of conventional rope. The result of this process is about a sixty to sixty five percent increase in density which, in combination with the pliability of the cotton threads, given cable 12 its flexibility and rigidity characteristics. As noted above, this density increase can vary from about fifty to seventy percent without causing a significant adverse effect on the performance characteristics of the cable.

By way of a specific examples, in the formation of a length of conventional cotton rope, three skeins of twisted cotton threads are twisted together such that ⅜ inch diameter skeins will form a rope 1⅛ inches in diameter. A one-foot length of such rope weights about 0.96 ounces. In the formation of cable 12 from three ⅜ inch diameter skeins, the resultant cable has a diameter of 1¼ inches and a one-foot length of such cable weighs at least about 1.44 ounces and preferably about 1.57 ounces. While both the cable and rope are formed from skeins of the same diameter, approximately fifty percent more individual cotton threads are twisted together in the formation of the cable skeins 13, 15 and 17, than are employed in the rope skeins.

Cable 12 can be manufactured in different sizes for differently sized birds. For example, cable 12 has also been formed in ⅝ inch diameter lengths from three skeins each 5/16 inches in diameter for small birds. A one foot length of such cable weighs at least about 0.48 ounces and preferably about 0.53 ounces. Cable 12 has also been manufactured in ⅞ inch diameter lengths from 7/16 inch diameter skeins for slightly larger birds. A one foot length of the 7/8 inch diameter cable weighs at least 0.72 ounces and preferably about 0.79 ounces. Regardless of the cable size, the density of the cable does not appreciably change.

The cage attachments 14 carried by cable 12 are preferably constructed of a durable plastic material and, as seen in FIG. 2, each such assembly defines a threaded male member 16 carried by an extended end of cable 12 and a threaded female cap member 18. Member 16 defines a cylindrical recess 20 therein, in which an end portion of cable 12 is secured by a suitable adhesive, and an axially projecting threaded cylindrical portion 22. Projecting portion 22 is provided with a radial slot 24 extending therethrough which is adapted to receive a portion of one of the wires 26 of the bird cage 11. To secure one end of the bird perch 10 to a conventional wire bird cage, the projecting portion 22 of member 16 is simply extended outwardly through the cage such that a cage wire 26 is disposed in slot 24. The cap member 18 is then threadably engaged with member 16 so as to secure the cage wire therebetween. It is to be understood, however, that other configurations of attachment assemblies could be employed with cable 12 to secure the perch to the bird cage.

A second embodiment of the invention is illustrated in FIG. 4. As seen therein, the bird perch 30 comprises a pair of dense cotton cables 32 and 34 wherein one of the cables, e.g., 32, is formed such that one of its skeins 36 extends snugly about the other cable 34 to form a relatively tight yet translatable slip tight fitment between the two cables. This fitment allows one to pull on cable 34 relative to cable 32 and adjust the location of the securement to obtain different perch configurations within the cage.

In constructing perch 30, a relatively long length of the dense cable is first formed as described above. That cable is then cut into relatively short lengths to define a plurality of cables 34. During the formation of a second relatively long length of cable, the previously severed cable lengths 34 are periodically inserted between the skeins as the skeins are tightly twisted about one another to form the second cable. The formed second cable is then cut into relatively short lengths to define a plurality of cables 32 with one of the skeins in each of cables 32 extending snugly about a cable 34. Each of cables 32 and 34 is provided with a cage attachment 14 at its extended ends for securement of the perch 30 to the walls of the bird cage. By sizing cables 32 and 34 such that they correspond in length to the transverse dimensions of the cage, two perpendicularly disposed elongated perches are defined at a single elevation within the cage as seen in FIG. 4. By oversizing the cables 32 and 34, the cables can be bent intermediary their ends and the location of the translatable fitment adjusted to form a wide variety of perch configurations. The rigidity of cables 32 and 34 resulting from their tightly twisted cotton threads allows the cables to retain their formed shape without the need for any additional support.

A third embodiment of the invention is illustrated in FIG. 6. As seen therein, the bird perch 40 comprises a single length of the densely formed cotton cable 42 which is twisted about itself to form a plurality of individual interconnected loops 44, 46 and 48. The extended ends 50 and 52 of cable 42 are secured in axial alignment within a plastic tubular member 54 by means of a suitable adhesive. Member 54 has a suitable attachment means 56 carried thereby for securement of the tubular member 54 to the bird cage. Because of the rigidity of cable 42 resulting from its dense configuration, the perch 40 need only be secured to the cage at one end thereof and can extend laterally across the interior of the bird cage without distorting. Each of the formed loops defines a separate self-supporting perch structure for one or more birds. In addition, the combination of the single attachment, the rigidity of the cable and interconnecting loops allows one to vary the shape and sizes the loops to accommodate differently sized birds or different numbers of relatively small birds. For example, three birds could use three rounded loops or rings, as shown in the drawing, with each bird having a perch surface in or on top of each ring. If six birds were to be placed in the cage, the individual loops could, if desired, each be formed into a relatively square configuration so as to provide six level perch surfaces, i.e., an upper and lower perch surface on each ring. Numerous other configurations could be employed with perch 40 due to the adjustability of the slip structure to provide a variety of bird perch surfaces. While three perch loops are provided in the configuration of the invention shown in FIG. 6, the numbers of such loops could be varied.

FIG. 7 illustrates another variation of the present invention wherein a single length of the densely formed cotton cable 60 is formed into a single ring 62 with the extended ends thereof being secured in a plastic tubular member 64 as in the prior embodiment. A suitable attachment means 66 is carried by the tubular member 64 for securement of the tubular member to the cage. The attachment member could be configured similar to cage attachments 14 wherein the threated male portion of the attachment projects perpendicularly from tubular member 54, as illustrated in the drawings, or could comprise an eyelet projecting from tubular member 54 to which a suitable connector is attached for suspending perch 40 from the top of the cage. Other fastening means could, of course, also be employed. Because of the rigidity of cable 60, the formed ring could be secured to the side of the bird cage by member 64 without distorting to provide a stable perch for caged birds.

Various other changes and modifications could be made in carrying out the present invention without departing from the spirit and scope thereof. Insofar as such changes are in the purview of the appended claims, they are to be considered as part of the present invention.

I claim:

1. A bird perch for use in a bird cage comprised of a plurality of tightly twisted skeins of cotton threads, said skeins defining a length of cotton cable having extended ends and a density of approximately fifty to seventy percent greater than conventional cotton rope so as to render said cable sufficiently flexible to be readily formed into a plurality of different set configurations and sufficiently rigid to retain a set configuration without additional support intermediary of said ends, and attachment means carried by said ends of said cable for attaching said ends to a bird cage whereby said perch provides a plurality of variable and stable cotton bird perch surfaces within said cage.

2. A bird perch for use in a bird cage comprised of three tightly twisted skeins of cotton threads, said skeins defining a length of cotton cable having extended ends and being sufficiently flexible so as to be readily formed into a plurality of different set configurations and sufficiently rigid to retain a set configuration without additional support intermediary of said ends, and attachment means carried by said ends for attaching said ends to a bird cage whereby said perch provides a plurality of variable and stable cotton bird perch surfaces within said cage.

3. The bird perch of claim 2 wherein the density of said cotton cable is about 0.7 to 0.8 grams per cubic centimeter.

4. The bird perch of claim 2 wherein said cable comprises over seventeen hundred threads per square centimeter.

5. The bird perch of claim 2 wherein each of said skeins define a diameter of about 5/16 inches, said cable defines a diameter of about ⅝ inches and a one-foot length of said cable weighs at least 0.48 ounces.

6. The bird perch of claim 2 wherein each of said skeins define a diameter of about 7/16 inches, said cable defines a diameter of about ⅞ inches and a one-foot length of said cable weighs at least 0.72 ounces.

7. The bird perch of claim 2 wherein each of said skeins define a diameter of about ¾ inches, said cable defines a diameter of about 1¼ inches and a one-foot length of said cable weighs at least 1.44 ounces.

8. The bird perch of claim 2 wherein said attachment means comprises a pair of male members and a pair of female cap members, each of said male members defining a cylindrical recess therein and a threaded extension projecting axially therefrom, each of said ends of said cable being secured within one of said recesses, each of said extensions defining a radial slot therein adapted to receive a portion of the bird cage, and each of said cap members being adapted to extend about and threadably engage one of said extensions and thereby secure the portion of the cage within said slot between said cap member and one of said male members whereby said cable is secured to and within the cage.

9. The bird perch of claim 8 wherein the density of said cotton cable is about 0.7 to 0.8 grams per cubic centimeter.

10. A bird perch for use in a bird cage comprised of a plurality of tightly twisted skeins of cotton threads, said skeins defining a length of cotton cable having extended ends and a density within the range of about 0.7 to 0.8 grams per cubic centimeter whereby said cable is sufficiently flexible to be readily formed into a plurality of different set configurations and sufficiently rigid to retain a set configuration without additional support intermediary of said ends, and attachment means carried by said ends for attaching said ends to a bird cage whereby said perch provides a plurality of variable and stable cotton bird perch surfaces within said cage.

11. The bird perch of claim 10 wherein said attachment means comprises a pair of male members and a pair of female cap members, each of male bolt members defining a cylindrical recess therein and a threaded extension projecting axially therefrom, each of said ends of said cable being secured within one of said recesses, each of said extensions defining a radial slot therein adapted to receive a portion of the bird cage, and each of said cap members being adapted to extend about and threadably engage one of said extensions and thereby secure the portion of the cage within said slot between said cap member and one of said male members whereby said cable is secured to and within the cage.

12. A bird perch for use in a bird cage comprising a pair of cables, each of said cables being comprised of a plurality of tightly twisted skeins of cotton threads and having a density within the range of about 0.7 to 0.8 grams per cubic centimeter so as to render said cable sufficiently flexible to be readily formed into a plurality of different set configurations and sufficiently rigid to retain a set configuration without additional support intermediary of its ends, one of said cables extending between the skeins of the other of said cables to define a translatable slip securement between said cables, and means for attaching the ends of said cables to the bird cage.

13. The bird perch of claim 12 wherein said attachment means comprises a pair of male members and a pair of female cap members, each of said male members defining a cylindrical recess therein and a threaded extension projecting axially therefrom, each of said ends of said cables being secured within one of said recesses, each of said extensions defining a radial slot therein adapted to receive a portion of the bird cage, and each of said cap members being adapted to extend about and threadably engage one of said extensions and thereby secure the portion of the cage within said slot between said cap member and one of said male members whereby said cables are secured to and within the cage.

14. A bird perch for use in a bird cage comprising a plurality of tightly twisted skeins of cotton threads so as to define a cotton cable having extended ends and a density within the range of about 0.7 to 0.8 grams per cubic centimeter whereby said cable is sufficiently flexible to be readily formed in a plurality of different set configurations, and sufficiently rigid to retain a set configuration, said cable defining a plurality of inter connected loops, a securement member for securing together the ends of said cable, and means carried by said securement member for attaching said cable to the bird cage whereby the flexibility of said cable allows said interconnected loops to be readily adjusted in size and configuration and the rigidity of said cable maintains said loops in said adjusted size and configuration without the need for additional support intermediary of said ends of said cable to provide a plurality of variable and stable cotton perch surfaces within said bird cage.

15. The bird perch of claim 14 wherein said securement member defines a hollow tube extending about said ends of said cable and means for maintaining said ends within said tube, and wherein said attachment means is carried by and projects radially from said tube.

* * * * *